United States Patent Office 3,787,352
Patented Jan. 22, 1974

3,787,352
METHOD OF PREPARING GLASS FIBER-ELASTOMER COMPOSITIONS
Alfred Marzocchi and John C. Martineau, Cumberland, R.I., assignors to Owens-Corning Fiberglas Corporation
Filed Sept. 2, 1971, Ser. No. 177,237
Int. Cl. C08f 45/04
U.S. Cl. 260—41 AG                    5 Claims

ABSTRACT OF THE DISCLOSURE

This invention is addressed to a method for the preparation of molding compounds formed of an elastomeric material reinforced with glass fibers wherein bundles of glass fibers which have been impregnated with an elastomer component are chopped to shorter lengths and then combined with elastomeric material while working the elastomeric material to separate the fibers forming the bundle each from the other and to uniformly distribute the fibers throughout the elastomeric material. The molded compositions of the present invention are characterized by significantly improved hysteresis characteristics when subjected to deformation under stress.

---

This invention relates to fiber-elastomeric products, and more particularly to a method for the combination of fibers with elastomeric materials as in the manufacture of fiber-reinforced elastomeric products.

As used herein, the term "elastomer" is intended to mean and include natural rubber in the cured or uncured stage, vulcanized or unvulcanized stage, and synthetic organic elastomeric materials such as styrene, nitriles, acrylic and esters and terpolymers thereof with styrene and acrylonitriles; styrene and vinyl pyridine; and EPDM rubbers as represented by butadiene polymers and copolymers with monoolefins such as butadiene-styrene copolymer, butadiene-acrylonitrile copolymers, butadiene-styrene-vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha monoolefin having from 3–20 carbon atoms, such as propylene, and a polyene, such as dicyclopentadiene, 1–4 hexadiene and preferably an alkylene or alkylidene norbornene, such as 5-alkylidene-2-norbornene and the like in which the alkylidene group numbers from 2–12 carbon atoms, and polysulfone rubbers.

It is now well known to combine synthetic organic and glass fibers with elastomeric materials in the manufacture of glass fiber-reinforced elastomeric products, such as driving belts, timing belts, pneumatic tires, etc. It has generally been the practice in the manufacture of glass fiber-elastomeric products to make use of glass fibers in the form of individual continuous or discontinuous glass fibers having a coating on the surfaces thereof to intertie the glass fibers to the elastomeric material, or preferably, glass fibers in the form of cords, yarns, strands or fabrics, hereinafter referred to as bundles, containing an impregnant which similarly serves to intertie the glass fiber bundles to the elastomeric material in which the glass fiber bundles are distributed.

Thus, the individual glass fibers or bundles of glass fibers are frequently laid down between layers of the elastomeric material in the desired arrangement, and the resulting composite is molded under heat and pressure to securely bond the glass fibers or bundles of glass fibers to the elastomeric material.

While the foregoing practice has been extremely effective in utilizing the desirable characteristics of the glass fiber reinforcements, it has been found that the resulting glass fiber-reinforced elastomeric products are nevertheless subject to certain disadvantages including heat built-up as the glass fiber-reinforced elastomeric product is subjected to stress.

It is known to the art that chopped glass fibers can be added to elastomeric materials to impart thereto strength and toughness. In U.S. Pat. No. 3,334,166 description is made of a method for producing a molding compound of elastomeric material reinforced with glass fibers in which a small proportion of glass fibers in the form of bundles is added to an elastomeric material and then the resulting combination of glass fiber bundles is worked to separate the individual glass fiber filaments forming the bundle each from the other. Thereafter, a larger proportion of glass fiber is added in the latter stages of working of the combination whereby the bundles subsequently added remain intact.

The resulting molding compound prepared in accordance with our invention disclosed and claimed in the foregoing patent is a compound in which the major proportion of the glass fiber bundle remain in the form of bundles of glass fibers while a minor proportion of the bundles are separated into individual filaments.

It has now been found that the amount of heat build-up of glass fiber reinforced elastomers subjected to stress can be significantly reduced by working a small amount of chopped bundles of impregnated glass fibers in combination with elastomeric materials until the individual filaments formed the bundles are uniformly distributed through the elastomeric material.

It is accordingly an object of the present invention to produce and to provide a method for producing a molding compound of an elastomeric material reinforced with glass fibers in which full utilization is made of the desirable characteristics of glass fibers.

It is a more specific object of the invention to produce and to provide a method for producing a molding compound of an elastomeric material reinforced with glass fibers having improved heat build-up characteristics when subjected to deformation under stress.

These and other objects and advantages of the present invention will appear more fully hereinafter, and, for purposes of illustration but not of limitation, an embodiment of the invention is shown in the accompanying drawing in which.

Figure 1:
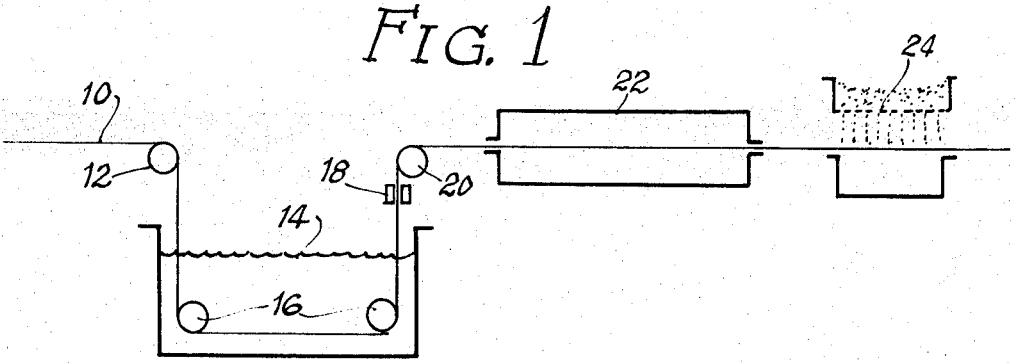
FIG. 1 is a schematic illustration of a method for the impregnation of a bundle of glass fibers in accordance with the practice of the invention.

In accordance with the practice of the present invention, glass fiber bundles which have been impregnated with an elastomeric component are chopped or cut into lengths of 0.1 to 0.3 inch, and then admixed with an elastomeric material. The resulting combination of the chopped glass fiber bundles and elastomeric material is worked to completely separate the individual fiber filaments of the bundle each from the other and to uniformly distribute the filaments throughout the elastomeric material constituting the continuous phase.

The resulting molding compound formed of an elastomeric material formed with glass fibers can then be molded either alone or in combination with additional reinforcing fibers in the manufacture of fiber-reinforced elastomeric products such as pneumatic tires drive belts and the like.

It has been found that the molding compound produced in accordance with the present invention is subject to significantly less heat build-up when subjected to deformation under stress. Without limiting the invention as to theory, it is believed that the combination of the glass fibers with the elastomeric material constituting the continuous phase by working a relatively small proportion of chopped bundles with the elastomeric material to separate the fibers forming the bundles each from the other serves to provide a molding compound in which the hysteresis effect due to the presence of the glass fibers in the system.

Hysteresis is frequently defined as the retardation of a chemical system in reaching equilibrium when the forces acting upon a body are changed, either in magnitude or direction. Thus, when a body is subjected to a force which acts upon the body, the body tends to return to its original state when the force is released. In an ideal system, such as a completely elastic material, as soon as a force on the material is released, the material will completely return to the state which existed prior to the application of the force, and the work performed on the material is completely recovered. In a nonideal system, however, the work performed by a force applied to a body is never completely recovered since some of the work performed by the force is lost as heat through internal friction.

Fiber reinforced-elastomeric systems are examples of nonideal systems in which work performed by forces acting on the system is partially lost to internal friction to produce heat by reason of the relative inelasticity of the glass fibers. It has been found in the practice of the present invention that the combination of glass fibers by working short bundles of fibers with an elastomeric material to separate the fibers forming the bundle provides a system in which work lost through internal friction is substantially minimized, with the result that fiber-reinforced elastomeric products formed from the molding compound have less heat build-up under stress.

Since heat build-up is well known as being one of the major factors in causing increased wear in fiber-reinforced elastomeric products, and particularly pneumatic tires or the like, the present invention provides a simple method for improving the wearing characteristics of fiber-reinforced elastomeric products. It has even been found that improved tread water of automobile tires is realized when the sidewalls of the tires are molded from the molding compound of the invention.

The amount of chopped bundles of fibers necessary to provide a molding composition having improved heat build-up characteristics is less than the amount of fibers added to elastomeric material for the purpose of increasing the toughness of fiber reinforced elastomers. For best results, use can be made of chopped bundles constituting from 2 to 15% by weight, and preferably 3 to 12% by weight, based upon the weight of the fiber reinforced molding composition.

Having described the basic concepts of the invention, reference is now made to the following description of preferred procedures for the preparation of chopped fiber bundles for use in the present invention and the preparation of molding compositions in accordance with the practice of the present invention.

Bundles of glass fibers, including strands formed of a plurality of individual fiber filaments, cords formed of two or more strands of fibers which may be plied and/or twisted together, or woven or nonwoven fabrics formed of strands or cords of glass fibers, for use in the practice of this invention can be impregnated by conventional means with an impregnant containing as elastomer component. Since the present invention upon the composition of the elastomer-containing impregnant, any of a number of such impregnants can be used in the impregnation of the bundles. For example, use can be made of the impregnant composition disclosed in U.S. Pat. No. 3,567,671:

EXAMPLE 1

Part A: Parts by wt.
- Distilled water _____ 732
- Sodium hydroxide _____ 1
- Resorcinol formaldehyde polymer in the form of a latex containing 75% solids (Penacolyte R-2170) _____ 48
- Formalin (37% formaldehyde) _____ 16

Part B:
- Butadiene - styrene - vinyl pyridine terpolymer (42% solids) _____ 900
- Ammonium hydroxide _____ 80

Part C:
- Water _____ 200
- Ammonium hydroxide _____ 15
- Vinyl chloride-vinylidene chloride copolymer (50% by weight solids, Dow Latex 874) ____ 350
- Microcrystalline paraffin wax (melting point 145–150° F.), Vultex Wax Emulsion No. 5 of General Latex and Chemical Corp. (56% solids) _____ 200

Part A in the above example is separately prepared by combining the ingredients and then aging for about 2–3 hours with alkali present in an amount sufficient to adjust the pH to between 7 and 7.5. The remainder of the ingredients are combined and the various parts are then mixed together. Aging of the entire mixture is not essential but beneficial results accrue, such as greater adhesion and stabilization of the mixture, after aging the entire mixture for from 10–24 hours before use to impregnate the glass fiber bundle.

However, a wide variety of other liquid impregnating compositions are represented by the following examples:

EXAMPLE 2

Parts by wt.
- Natural rubber latex-resorcinol formaldehyde resin dispersed in aqueous medium to a 38% solids (Lotol 5440, U.S. Rubber Company) _____ 60
- Vulcanizing agent _____ 1
- Water _____ 39

EXAMPLE 3

Parts by wt.
- Resorcinol formaldehyde resin _____ 2
- Formalin (37% solution) _____ 1
- Concentrated ammonium hydroxide _____ 2.7
- Vinylpyridine terpolymer (42% latex) _____ 25
- Neoprene rubber latex (50% solids) _____ 41
- Butadiene latex (60% solids) _____ 5
- Sodium hydroxide _____ .05
- Gamma-aminopropyltriethoxy silane _____ 1
- Vulcanizing agent _____ 1
- Water _____ 1100

In the impregnation of the glass fiber bundle, it is desirable to achieve as full impregnation as is possible to maximize the anchorage of the glass fibers in the bundle with the elastomeric material. For still fuller integration it is desirable also to make use of an elastomeric component in the impregnating composition which is compatible with the elastomer forming the continuous phase or which is still capable of sufficient flow during working or molding of the compound to blend with the continuous phase of elastomer during the molding and working operations. For this purpose, it is desirable to heat the impregnated strand or bundle of glass fibers by an amount sufficient either to drive off the diluent or to effect removal of the diluent plus advancement of the elastomeric component of the impregnant to a stage short of complete cure or vulcanization.

Impregnation with the aqueous compositions of Examples 1–3 can be carried out by way of any of a variety of known techniques for the impregnation of glass fiber bundles. Referring specifically to FIG. 1 of the drawing, a strand 10 formed of a plurality of glass fibers which have preferably, although not necessarily, been sized in forming, is passed over a guide roller 12 for passage downwardy into an impregnating bath 14 containing aqueous impregnating composition of Examples 1-3. The bundle is then passed under a pair of rollers 16 to effect a sharp bend in the bundle which operates to open the bundle to facilitate more complete penetration of the aqueous treating composition in the bundle of glass fibers for complete impregnation of the bundle. The impregnated bundle is then raised from the bath for passage through a roller or die 18 which operates to remove excess treating composition from the bundle and to work the treating composition into the bundle. Thereafter, the endless bundle is advanced over roller 20 into a drying oven 22, preferably in the form of an air drying oven maintained at a temperature above ambient temperature, and preferably a temperature within the range of 150-350° F., to accelerate removal of the aqueous diluent and to set the impregnant in situ in the glass fiber bundle. Drying will occur within a relatively short period of time, generally within 0.1-30 minutes depending upon the temperature of drying.

The amount of impregnant applied to the glass fiber bundles normally ranges from 10-35% by weight based upon dry solids, although greater or lesser amounts can be used as desired.

As indicated, the individual glass fibers forming the bundle are preferably, although not necessarily, provided with a size coating. In the most preferred embodiment of the present invention, the glass fiber surfaces contain a size coating formulated to include an anchoring agent, such as gamma-aminopropyltriethoxy silane. Instead of gamma-aminopropyltriethoxy silane as the anchoring agent, use can be made of a wide variety of well known anchoring agents in the form of silanes, silanols and siloxanes which serve to establish a more secure bonding relationship between the glass fiber surfaces and the elastomeric material with which the glass fibers are combined.

Figure 2:
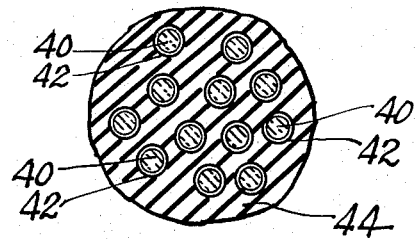
FIG. 2 is a cross sectional view of a glass fiber bundle processed in accordance with the method illustrated in FIG. 1.

The resulting bundle is shown in cross section in FIG. 2 of the drawing. As can be seen from this figure, the bundle is formed of a plurality of glass fibers 40 which have an optional size coating 42 on the surfaces of the individual filaments. The impregnant 44 in the form of the solids from the treating composition of this invention completely penetrates the bundle and serves to separate the glass fibers each from the other to effect a unitary bundle structure.

To protect the fibers against seizure during subsequent processing to cut or chop the strands or bundles to shorter lengths, the impregnated bundles 44 can be coated with a lubricant in the form of powdered zinc stearate, graphite, carbon black, silica dust, fine powdered glass and the like materials which need not be washed or otherwise removed from the surfaces since such materials can beneficially function either as a filler in the molded rubber product or as an agent which enters into the cure or vulcanization. Such dry powdered material can be sprinkled onto the impregnated bundle of glass fibers as it passes from the heating zone, as by passing the impregnated bundle under a sieve 24 through which the powder is dispensed, or by running the impregnated strand through a mound of the powdered material followed by engagement of the strand with a brush or wiper for removing excess from the surfaces of the bundle.

Thereafter, the endless bundle of fibers is reduced to shorter lengths as by processing the bundle of glass fibers through cutters or in a chopper wherein the fibrous bundles are reduced to the average length desired while still retaining the fibers in the multi-filament or bundle form. Reduction to an average length of 0.1 to 0.3 inch is preferred for most applications.

The chopped bundles of fibers are then admixed with an elastomeric material in an uncured and/or unvulcanized state which is the same or different as the elastomeric component of the impregnant and the resulting mixture is worked, as by conventional rubber processing steps such as milling, banburying and the like, to separate the individual filaments each from the other and to uniformly distribute all the fiber filaments throughout the continuous phase of the elastomeric material in which the fibers are distributed. The working time required for this purpose generally ranges from 1 to 10 minutes, although the use of longer processing times is not disadvantageous even though there is a tendency for the fiber lengths to be broken down over long periods of working.

Figure 3:
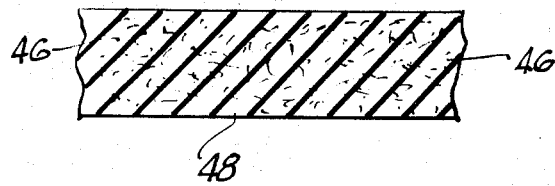
FIG. 3 is a cross sectional view of a molding compound of an elastomeric material reinforced with glass fiber prepared in accordance with the practice of this invention.

The resulting glass fiber reinforced molded compound is illustrated in FIG. 3 of the drawing. In this figure, the individual glass fibers 46 which have been separated each from the other by the working of the glass fiber-elastomeric composite are uniformly distributed throughout the elastomeric material 48 which constitutes a continuous phase. As is indicated in FIG. 3, the glass fibers extend throughout the elastomeric material 48 constituting the continuous phase in all directions to provide both the desired reinforcement and the improved resistance to hysteresis. By reason of the impregnant contained in the original glass fiber bundles, a secure bonding relationship is established between the elastomeric material and the glass fiber surfaces as a result of the working operation.

In the preferred practice of the invention, the molding compound is worked into the form of sheets of the glass fiber-reinforced elastomeric material for use in the molding of fiber-reinforced elastomeric products. Such techniques are well-known to those skilled in the art, and for a more complete description of same, reference can be made to U.S. Pat. No. 3,334,166 the disclosure of which is incorporated herein by reference.

The following example illustrates specific procedures which can be used in the practice of the present invention in the preparation of molding compositions.

EXAMPLE 4

A continuous glass fiber bundle which has been impregnated with the composition of Example 1 is chopped and cut into lengths of 0.25 inch. Varying amounts of the chopped fibers are then admixed with natural rubber, and the resulting mixtures are milled for 4 minutes to form strips of glass fiber-reinforced rubber in which the individual laments have been separated from the chopped bundles and uniformly distributed throughout the rubber stock.

The resulting strips are then tested for work recovery when deformed while under a constant stress, using ASTM (D412 Die B). In these tests, each specimen is subjected to a constant stress of 1000 p.s.i., and then deformed in a number of cycles. The average work recovery is set forth in the following table:

| Amount of chopped bundles (percent by weight) | | Working recovery (percent) |
|---|---|---|
| 0 | 1st cycle | 38 |
|   | 9th cycle | 76 |
| 4.8 | 1st cycle | 25 |
|   | 9th cycle | 62 |
| 7.9 | 1st cycle | 28 |
|   | 9th cycle | 60 |
| 11 | 1st cycle | 35 |
|   | 9th cycle | 67 |

As can be seen from the foregoing, the samples containing the chopped fiber bundles are subject to good work recovery approaching that which is obtained with the sample which contains no chopped bundles. As indicated above this work recovery is manifested in lower heat build-up in a glass fiber-reinforced elastomeric product in use under stress.

It will be apparent that various modifications and changes can be made in the details of formulation, procedure and use without departing from the spirit of the invention, especially as defined in the following claims.

We claim:

1. A method for the preparation of a molding compound of an elastomeric material reinforced with glass fibers having improved hysteresis characteristics, comprising admixing from 2 to 15% by weight of bundles of a plurality of glass fibers impregnated with an impregnant containing an elastomer component which separates the fibers each from the other to define unitary bundles, said bundles having been cut to lengths of 0.1 to 0.3 inch after impregnation, with an elastomeric material, working the resulting mixture to separate the fibers forming the bundle and to uniformly distribute substantially all the fibers throughout the elastomeric material, and molding the resulting mixture to form a glass fiber reinforced elastomeric material.

2. A method in accordance with claim 1 wherein the bundles are worked for a time of 1 to 10 minutes.

3. A method in accordance with claim 1 wherein the impregnant constitutes from 10 to 35% by weight of the bundle.

4. A method in accordance with claim 1 wherein the individual fibers forming the bundle include a coating on the surfaces thereof containing an anchoring agent to promote a secure bond between the glass fiber surfaces and the elastomeric material.

5. A method in accordance with claim 1 wherein the elastomeric material is in a uncured and unvulcanized state.

References Cited
UNITED STATES PATENTS

| | | | |
|---|---|---|---|
| 3,334,166 | 8/1967 | Marzocchi | 264—136 |
| 3,635,752 | 1/1972 | Baer et al. | 260—41 AG |
| 3,654,219 | 4/1972 | Boyer et al. | 260—41.5 |

MORRIS LIEBMAN, Primary Examiner

S. M. PERSON, Assistant Examiner

U.S. Cl. X.R.

260—41.5 A; 264—136